(No Model.)

C. E. BALL.
ELECTRICAL CONDUCTOR.

No. 244,167. Patented July 12, 1881.

WITNESSES:
Jos. B. Connolly
S. J. Van Stavoren

INVENTOR,
Chas. E. Ball
by Connolly Bros. ATTORNEYS.

N. PETERS, Photo-Lithographer, Washington, D. C.

UNITED STATES PATENT OFFICE.

CHARLES E. BALL, OF PHILADELPHIA, PENNSYLVANIA.

ELECTRICAL CONDUCTOR.

SPECIFICATION forming part of Letters Patent No. 244,167, dated July 12, 1881.

Application filed June 7, 1881. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Electrical Conductors; and I do hereby declare the following to be a full, clear, and exact description of the invention, reference being had to the accompanying drawings, which form part of this specification, in which—

Figure 1:
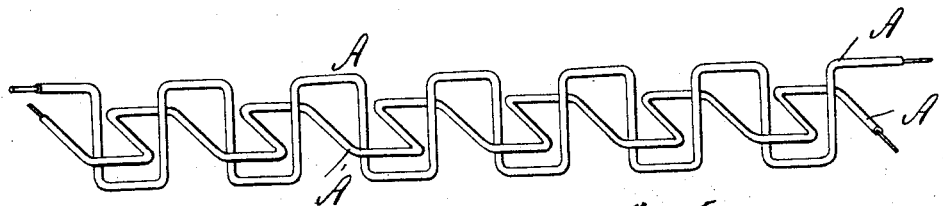
Figure 2:
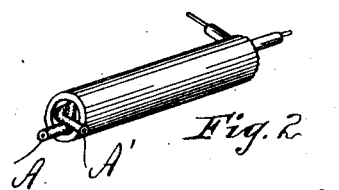
Figure 3:
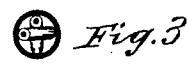
Figure 4:
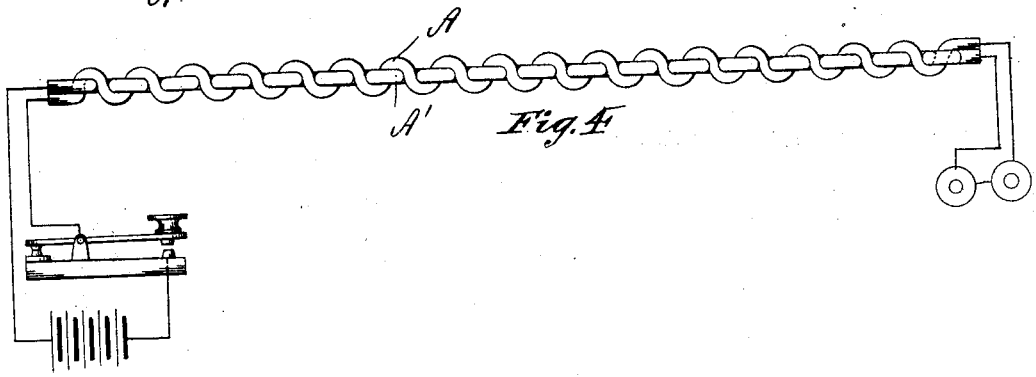
Figure 5:
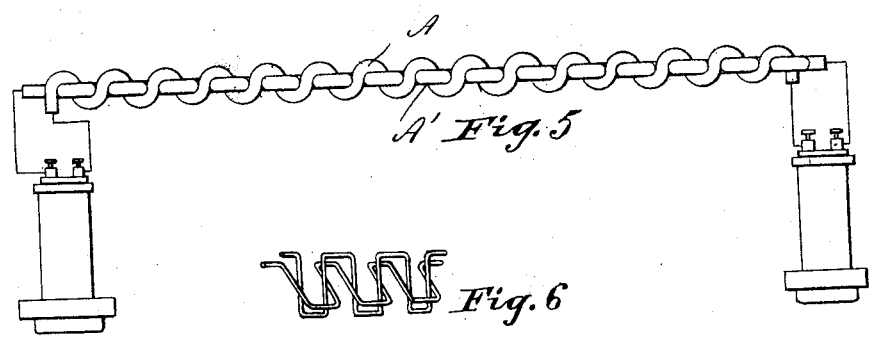
Figure 6:

Figure 1 is a perspective of my invention. Fig. 2 is a perspective of the conductor and the lead sheathing. Fig. 3 is an end view of the same. Figs. 4 and 5 represent my improved conductor applied to telegraphic apparatus and speaking-telephones respectively; and Fig. 6 is a detail perspective of a modification of my invention.

The object of my invention is to provide, for telephonic, telegraphic, and other uses involving the transmission of electric currents, a conductor which shall be free from inductive influences of other adjacent conductors, or of electric currents flowing over the latter.

My invention consists in the peculiar construction of an electric conductor hereinafter described, said conductor consisting of two wires or metallic circuits bent and interlocked or plaited so as to cross and recross one another, thus remaining at all times equidistant from one another without being parallel.

It is well understood that if an electric conductor in one circuit be placed in parallel proximity to another conductor in a different circuit a working or primary current of electricity sent over the latter will induce a secondary or derived current in the former—for example, that if a telephone-line be run parallel with a telegraph-line within such distance as will permit derived currents to be set up messages sent over the telegraph-line will be communicated inductively to the telephone line, and will be heard in the receiving-instrument at the terminals of the latter. This is a source of great annoyance and seriously interferes with the use of the telephone, in many cases preventing its employment where otherwise it would be called into requisition. Attempts have heretofore been made to overcome or prevent such induced currents. In one case it has been proposed to use two conductors parallel with each other, one forming the return-circuit for the other. In another case the conductor has been made in the form of a solenoid, one circuit being a helix and the other passing through or coinciding with the axis of the latter. The objection to these is that the parallel conductors cannot in practice be arranged at the same relative distance from neighboring conductors, and that in the solenoid, owing to the helix being of so much greater length than the axial conductor, it must have the diameter of its wire enlarged until the resistances of the conductors are equalized, thus increasing enormously the weight, area, and expense of the conductor. By my construction, however, the two parts of the circuit (meaning thereby the line over which the working current is transmitted and the return-line which completes said circuit) are made equal in length, and, being of like area, have therefore the same resistance, being so arranged that, without being parallel to each other, they constantly are equidistant from each other and from any neighboring conductor.

Referring to the accompanying drawings A and A' represent two like metallic conductors or wires forming one circuit, one being a return for the other. Each wire is bent substantially as shown, and both are so disposed that their bends cross and recross one another constantly, the bends of one being in a plane perpendicular to the plane of the bends of the other. By this construction and disposition of the wires they are kept constantly equidistant from, yet at no time parallel to, each other, for at any point or transverse section of the conductor formed of both one will be found crossing the other. They are also equidistant from any neighboring conductor, so that any induced current derived therefrom in one will be neutralized by the equal but opposite action in the other.

The wires forming my non-inductive conductor should be thoroughly insulated from each other, which may be done in the usual or any suitable manner by wrappings or coatings. In practice I prefer to first cover the wires with cotton, silk, or other fibrous insulating material, then coat them with paraffine, then bend and dispose them relatively to one another, then fill up their intersticial spaces with insulating-packing, and finally cover them with lead sheathing, thus forming a cable. Two or more of these conductors may be run side by side, or in a conduit common to both, without in any manner interfering with one another, one of said conductors being used as a telephone-line, another as a telegraph-line, and a third as a conductor for currents for producing illuminating or other effects.

What I claim as my invention is as follows:

The conductor herein described, composed of two wires or lines bent and arranged relatively to one another, so as to cross and recross constantly in planes perpendicular to one another, maintaining a constant distance without parallelism, substantially as set forth.

In testimony that I claim the foregoing, I have hereunto set my hand this 1st day of June, 1881.

CHAS. E. BALL.

Witnesses:
S. J. VAN STAVOREN,
CHAS. F. VAN HORN.